United States Patent
Kazumori et al.

[11] Patent Number: 5,947,000
[45] Date of Patent: Sep. 7, 1999

[54] SERVO OPERATION APPARATUS FOR A TRANSMISSION

[75] Inventors: Keiichi Kazumori; Hitoshi Muto, both of Ageo; Kazunari Imasato, Yono, all of Japan

[73] Assignees: Nissan Diesel Motor Co., Ltd.; Sanwa Seiki Ltd., both of Saitama-ken, Japan

[21] Appl. No.: 09/206,164

[22] Filed: Dec. 7, 1998

Related U.S. Application Data

[62] Division of application No. 08/811,303, Mar. 4, 1997, Pat. No. 5,857,400.

[30] Foreign Application Priority Data

Mar. 29, 1996 [JP] Japan ...................................... 8-077673

[51] Int. Cl.⁶ ............................. F15B 13/16; F15B 9/10
[52] U.S. Cl. ............................. 91/364; 91/375 R; 91/378
[58] Field of Search ............................. 91/359, 364, 368, 91/374, 375 R, 376 R, 378

[56] References Cited

U.S. PATENT DOCUMENTS

| | | | |
|---|---|---|---|
| 1,082,733 | 12/1913 | Casey et al. | 91/375 R |
| 1,830,636 | 11/1931 | Bragg et al. | 91/378 |
| 1,848,923 | 3/1932 | Almen | 91/368 |
| 1,978,738 | 10/1934 | Bragg et al. | 91/374 X |
| 2,579,028 | 12/1951 | Baldwin | 91/378 |
| 2,605,750 | 8/1952 | Kupiec | 91/378 |
| 2,755,777 | 7/1956 | Gerwig et al. | 91/376 R X |
| 4,542,662 | 9/1985 | Bieber | 91/376 R X |
| 4,742,724 | 5/1988 | Jimbo et al. | 91/374 X |

FOREIGN PATENT DOCUMENTS

| | | |
|---|---|---|
| 3-93650 | 9/1991 | Japan . |
| 3-93651 | 9/1991 | Japan . |
| 408210500 | 2/1995 | Japan . |
| 409217828 | 8/1997 | Japan . |
| 409264421 | 10/1997 | Japan . |
| 409292020 | 11/1998 | Japan . |

*Primary Examiner*—John E. Ryznic
*Attorney, Agent, or Firm*—McDermott, Will & Emery

[57] ABSTRACT

A servo operation apparatus for a transmission comprising an input shaft to which the shift-change operation force is mechanically transmitted from a shift lever, a servo unit for boosting the shift-change operation force by feeding a working fluid, and a valve device which feeds the working fluid to, or drains the working fluid from, the servo unit depending upon the shift-change operation of the shift lever, wherein provision is made of an working fluid feed control means which feeds the working fluid in such a manner that the pressure of the working fluid in the servo unit is raised with a steep gradient in the former half until a predetermined initially raised pressure value is reached and, thereafter, is raised in the latter half with a gradient less steep than that of said former half. Or, when the apparatus is equipped with a reaction device which imparts reaction to the shift-change operation force transmitted to the input shaft by utilizing the working fluid, provision is made of a working fluid feed control means which feeds the working fluid in such a manner that the rise of the pressure of the working fluid in the reaction device is delayed behind the rise of the pressure of the working fluid in the servo unit.

6 Claims, 11 Drawing Sheets

SERVO OPERATION APPARATUS FOR A TRANSMISSION

This application is a divisional of application Ser. No. 08/811,303 filed Mar. 4, 1997, now U.S. Pat. No. 5,857,400.

FIELD OF THE INVENTION

The present invention relates to a servo operation apparatus for a transmission which boosts the shift-change operation force and transmits it to the transmission.

RELATED ART OF THE INVENTION

Transmissions of large vehicles such as trucks have heretofore been provided with a servo operation apparatus (hereinafter referred to as power-shift apparatus) which utilizes a working fluid (high-pressure air) in order to decrease the shift operation force and, particularly, to decrease the shift operation force during the time of synchronization where a large operation force is required (see Japanese Unexamined Utility Model Publication Nos. 3-93650 and 3-93651).

The conventional power-shift apparatus includes an input shaft to which the shift-change operation force is mechanically transmitted from a shift lever, a servo unit which boosts the shift-change operation force by feeding the working fluid to a servo chamber of the synchronizing side and to a servo chamber of the drag side that are divided by a piston inscribing a cylinder, an output shaft to which is secured the piston as a unitary structure and which is disposed to move relative to the input shaft and transmits the boosted shift-change operation force to the transmission, and a valve device which switchingly feeds the working fluid to either the servo chamber of the synchronizing side or the servo chamber of the drag side depending upon the relative positions of the input shaft and the output shaft.

There has further been proposed a power-shift apparatus having reaction devices on both the synchronizing side and the drag side to impart the reaction that serves as a drag to the shift-change operation force that is transmitted to the input shaft by feeding the working fluid, in order to impart comfortable feeling shift. In this case, the valve device changes over the feed of working fluid to the servo unit and to the reaction devices.

In such a power-shift apparatus, however, the shift-operation force decreases simultaneously with the completion of the synchronization, and the moving resistance of the output shaft suddenly decreases. Therefore, the working fluid that had been giving thrust to the output shaft quickly expands causing the output shaft to move suddenly. Accordingly, the relative positions of the input shaft and the output shaft are reversed, and the working fluid is fed to the servo chamber of the drag side to create a drag which suppresses the motion of the output shaft.

When the pressure in the servo chamber of the drag side is not quickly raised, however, the drag is not sufficiently created to suppress the motion of the output shaft, and the impact force is not decreased to a sufficient degree when the relative displacements of the input shaft and the output shaft become maximum. The impact force is transmitted to the shift lever through the input shaft, and a driver so feels that an impact force is produced by the shift lever in the direction of shift, adversely affecting the feeling of shift.

In the power-shift apparatus having reaction devices, furthermore, the working fluid is also fed to the reaction device of the drag side simultaneously with the completion of the synchronization, whereby the input shaft suddenly moves toward the direction of shift creating an impact force. This impact force is transmitted to the shift lever through the input shaft to adversely affect the feeling of shift.

SUMMARY OF THE INVENTION

The present invention was accomplished in view of the problems inherent in the above-mentioned prior art, and its object is to control the pressure of the working fluid in the servo chamber or the reaction chamber of the drag side, to decrease the impact force after the completion of the synchronization that was inherent in the conventional power-shift apparatus, and to improve the feeling of shift, by feeding the working fluid to the servo device or the reaction device of the drag side through a volume chamber after the completion of the synchronization.

When the pressure of the working fluid in the servo unit of the drag side is controlled, the object of the invention is to quicken the initially raised pressure of the working fluid in the servo unit to increase the drag, to suppress a sudden motion of the output shaft, and to improve the feeling of shift, by using the volume chamber as a reservoir from where the working fluid is fed into the servo unit.

When the working fluid in the reaction device of the drag side is suppressed, the object of the invention is to delay the initially raised pressure of the working fluid in the reaction device, to suppress a sudden motion of the input shaft in the direction of shift, and to improve the feeling of shift, by using the volume chamber as an expansion chamber from where the working fluid is fed to the reaction device.

In order to accomplish the above-mentioned objects, the present invention deals with a servo operation apparatus for a transmission comprising an input shaft to which the shift-change operation force is mechanically transmitted from a shift lever; a servo unit for boosting said shift-change operation force by feeding a working fluid from a working fluid feed source to a servo chamber of the synchronizing side and to a servo chamber of the drag side divided by a piston inscribing a cylinder in the apparatus body; an output shaft to which said piston is secured as a unitary structure and which is disposed to move relative to said input shaft and transmits the shift-change operation force boosted by said servo unit to a transmission; a valve device which switchingly feeds the working fluid to the servo chamber of the synchronizing side from the start of the shift to the completion of the synchronization and to the servo chamber of the drag side from the completion of the synchronization to the completion of the shift depending upon the relative positions of said input shaft and said output shaft; and a first working fluid feed control means which feeds the working fluid in such a manner that the pressure of the working fluid in the servo chamber of the drag side is raised with a steep gradient in the former half until a predetermined initially raised pressure value is reached and, thereafter, is raised in the latter half with a gradient less steep than that of said former half.

The first working fluid feed means is constituted by providing a throttle portion in a working fluid feed passage of from said working fluid feed source to said valve device, and by providing a pressure storing portion for storing the working fluid in the working fluid feed passage of front said throttle portion to said valve device. Here, concretely speaking, the pressure storing portion may be communicatingly connected to, or interposed in, the working fluid feed passage of from said throttle portion to said valve device.

According to this constitution, when the working fluid is to be fed to the servo chamber of the drag side after the completion of the synchronization, the working fluid stored in the pressure storing portion is first fed to the servo chamber and, then, the working fluid is fed to the servo chamber from the working fluid feed source through the throttle portion and the pressure storing portion. That is, the initially raised pressure in the servo chamber of the drag side is quickened, making it possible to create a sufficient degree of drag force against the motion of the output shaft after the completion of the synchronization. Furthermore, if a point at which the gradient of pressure rise of the working fluid suddenly changes, i.e., the initially raised pressure value, is set to be lie within a permissible pressure range for the mechanical portions at the time of synchronization, the impact to the mechanical portion caused by a quick feed of the working fluid lies within a permissible range, too, and the mechanical portion is prevented from being damaged. As a result, the impact force is decreased at a moment when the relative displacements of the input shaft and the output shaft become maximum, and the impact force transmitted to the shift lever decreases, and the feeling of shift is improved.

Here, the pressure storing portion may be formed between the peripheral wall of the piston and the inner wall of the cylinder.

According to this constitution, the pressure storing portion is formed by utilizing the peripheral wall of the piston, the peripheral wall of the piston and the inner wall of the cylinder, or the cylinder. Therefore, there is no need to separately provide the pressure storing portion, and the structure of the servo operation apparatus can be simplified.

Furthermore, the pressure-storing portion may be provided at the inlet of the working fluid feed passage in the apparatus body, and the throttle portion may be formed at the inlet of the pressure storing portion. In this case, the pressure storing portion may be incorporated in the apparatus body as a unitary structure, or may be separately formed and may then be coupled to the apparatus body. Or, the pressure storing portion may be formed integrally with the working fluid feed pipe which connects said working fluid feed source to said apparatus body.

According to this constitution, when the working fluid is fed to the pressure storing portion from the working fluid feed source, the throttle portion is formed at the inlet of the pressure storing portion and the flow resistance of the working fluid increases. Therefore, the working fluid is fed to the pressure storing portion at a small rate. When the working fluid is fed to the servo chamber of the drag side after the completion of the synchronization, therefore, the working fluid stored in the pressure storing portion is fed, first, and, then the working fluid is fed from the working fluid feed source.

Moreover, the working fluid feed passage may be partly formed inside the input shaft, or may be formed in the peripheral wall of the cylinder. The valve device comprises a nearly cylindrical seat housing having valve seats formed at both ends thereof, valves disposed in said seat housing and come into contact with or separate way from so as to be closed or opened, springs interposed between said valves and urging said valves against said valve seats so as to be closed, lifters which freely slide relative to said input shaft to separate said valves away from said valve seats overcoming the urging force of said springs so as to be opened, and contact members secured to said input shaft and come in contact with said lifters accompanying the motion of said input shaft to move said lifters in the direction of opening the valves; and said valve device is secured inside said output shaft, and said input shaft penetrates through said valve device to freely slide in the axial direction.

According to this constitution, the working fluid is fed to the valve device through the working fluid feed passage formed inside the input shaft or in the peripheral wall of the cylinder. Based upon the relative positions of the input shaft and the output shaft, the lifters in the valve device push the valves in the directions to separate away from the valve seats so as to be opened overcoming the urging force of the springs. The working fluid fed to the valve device is further fed to the servo chamber of the synchronizing side.

According to this constitution, the reaction devices after the completion of the synchronization are supplied with the working fluid having a decreased pressure after having once expanded in the servo chamber of the drag side. Therefore, the pressure of the working fluid mildly rises in the reaction devices. Accordingly, the working fluid is prevented from being suddenly supplied into the reaction devices, an impact force created in the reaction device after the completion of the synchronization is decreased, and the feeling of shift is further improved owing to synergistic effect together with the action for decreasing the impact force accomplished by the servo chamber of the drag side.

Furthermore, the servo operation apparatus for a transmission may comprise an input shaft to which the shift-change operation force is mechanically transmitted from a shift lever; a servo unit for boosting said shift-change operation force by feeding a working fluid from a working fluid feed source to servo chambers divided by a piston inscribing a cylinder; a reaction device of the synchronizing side and a reaction device of the drag side for imparting the reaction that works as a drag against said shift-change operation force upon being supplied with said working fluid; an output shaft to which said piston is secured as a unitary structure and which is disposed to move relative to said input shaft and transmits the shift-change operation force boosted by said servo unit to a transmission; a valve device which switchingly feeds the working fluid to said servo unit and said reaction device of the synchronizing side from the start of the shift to the completion of the synchronization and to said servo unit and said reaction device of the drag side from the completion of the synchronization to the completion of the shift depending upon the relative positions of said input shaft and said output shaft; and a second working fluid feed control means which feeds the working fluid in such a manner that the rise of the pressure of the working fluid in said reaction device of the drag side is delayed behind the rise of the pressure of the working fluid in said servo unit.

Furthermore, said reaction device may be constructed to be supplied with said working fluid through said servo chamber. According to this arrangement, the reaction devices are supplied with the working fluid which exhibits a decreased pressure due to the expansion in the servo chamber. Therefore, the rise in the pressure of the working fluid in the reaction devices is attenuated. Accordingly, since the working fluid is prevented from being suddenly supplied directly into the reaction devices, for example, an impact created in the reaction device after the completion of the synchronization is decreased and the shift feeling is further improved.

Concretely speaking, the valve device includes a nearly cylindrical seat housing having valve seats formed at both ends in the axial direction thereof, valves disposed in said seat housing and come into contact with, or separate way from, said valve seats so as to be closed or opened springs interposed between said valves and urging said valves against said valve seats so as to be closed, and lifters which move together with said input shaft in the axial direction thereof to separate said valves away from said valve seats overcoming the urging force of said springs so as to be opened; and said valve device is secured inside said output shaft, said input shaft penetrates through said valve device to freely slide in the axial direction thereof, the working fluid is fed to said valve device through a working fluid passage formed inside said input shaft and a throttle portion formed in said input shaft, and said reaction devices are each constituted by a piston formed in the peripheral wall of said lifter, a cylinder inscribed by said piston, and a spring which is interposed between said piston and said cylinder to urge said piston toward a direction to separate away from said valve.

According to this constitution, depending upon the relative positions of the input shaft and the output shaft, the lifters in the valve device push the valves toward the direction to separate away from the valve seats overcoming the urging force of the spring so as to be opened. The working fluid fed to the valve device is further fed to the servo unit and the reaction device of the synchronizing side. When the working fluid is fed to the reaction device of the drag side after the completion of the synchronization, the pressure of the working fluid in the reaction device is mildly raised by the second working fluid feed control means, whereby the input shaft is prevented from being suddenly moved in the direction of the shift operation by the working fluid that is fed to the reaction device of the drag side. It is therefore made possible to greatly decrease the impact force caused by a sudden motion of the input shaft, to decrease the impact force transmitted to the shift lever and to improve the feeling of shift.

Furthermore, the second working fluid feed control means may be constituted by a sealing member for shutting off a communication passage which directly communicates said valve device with said reaction devices, and a communication passage which communicates said servo unit with said reaction devices, enabling said valve device to be indirectly communicated with said reaction devices though said servo unit.

According to this constitution, when the working fluid is to be fed to the reaction device of the drag side after the completion of the synchronization, the working fluid is not directly fed to the reaction device due to the sealing member but is fed to the reaction device after having once expanded in the servo chamber to have a decreased pressure. Therefore, the pressure of the working fluid is prevented from being suddenly raised in the reaction device. Besides, the above effect is exhibited by a simple constitution without causing the servo operation apparatus for the transmission to become bulky, heavy or expensive.

Furthermore, the sealing member may be an O-ring.

According to this constitution, use of the O-ring which is a standardized article that is widely used makes it possible to suppress the cost of the servo operation apparatus for the transmission as much as possible and to maintain reliability of the sealing member.

Moreover, the sealing member may have a sealing portion which so deforms as to usually maintain sealing in the communication passage through which said valve device is directly communicated with said reaction devices and to no longer maintain the sealing when the working fluid is to be drained from said reaction devices.

According to this constitution, the working fluid, after the completion of the synchronization is drained from the reaction device of the synchronizing side through the servo unit of the synchronizing side and through the communication passage which directly communicates the reaction device with the valve device via the sealing member. Therefore, the working fluid is quickly drained, the moving resistance of the input shaft decreases immediately after the completion of the synchronization, and the moving speed increases. As a result, the timing for opening the valve of the drag side after the completion of the synchronization can be delayed, the reaction device causes the input shaft to move less suddenly in the direction of shift operation, and the feeling of shift is improved.

Other objects and features of the present invention will become obvious from the following description of the embodiments in conjunction with the accompanying drawings.

PREFERRED EMBODIMENTS

The present invention will now be described in detail with reference to the accompanying drawings.

Figure 1:
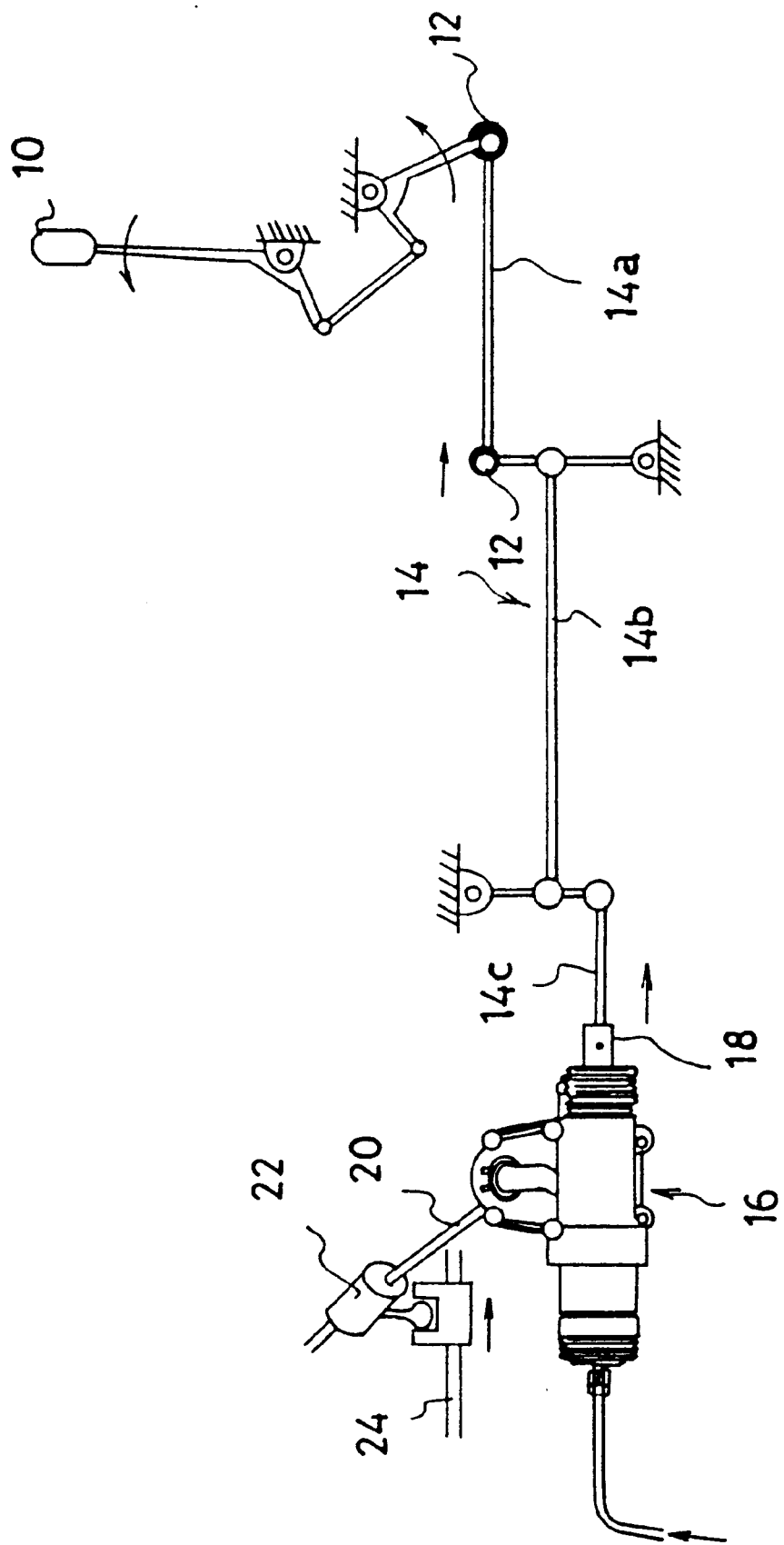
FIG. 1 is a diagram illustrating the constitution of a general servo operation apparatus and an operation force transmission system.

FIG. 1 illustrates the constitution of a general power-shift apparatus and an operation force transmission system mounted on a vehicle.

The shift-change operation force (shift-change force that is input) exerted on a shift lever 10 is transmitted to an input shaft 18 of a power-shift apparatus 16 through a link mechanism 14 constituted by a plurality of link rods 14a to 14c with rubber dampers 12 interposed among them, and the input shaft 18 is operated in the axial direction depending upon the shift-change operation force. The power-shift apparatus 16 boosts the operation force input to the input shaft 18 from the shift lever 10 into an output operation force nearly proportional to the input operation force relying upon the action of the high-pressure air which is a working fluid. This output operation force turns a select-and-shift lever 22 of a transmission via a shift shaft 20, so that a shift rod 24 is slid in the axial direction to execute the shift-change operation.

Figure 2:
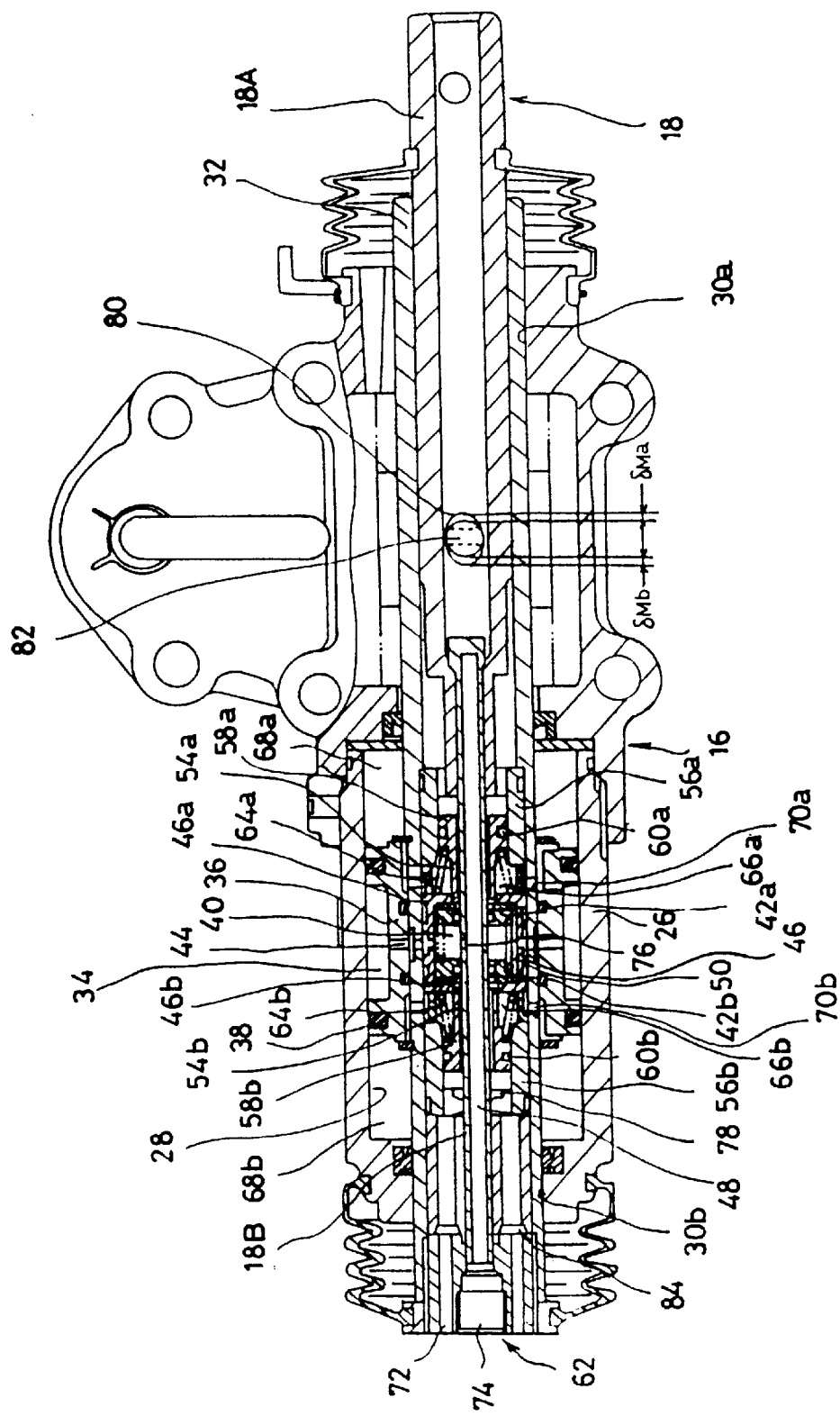
FIG. 2 is a diagram illustrating the whole servo operation apparatus according to a first embodiment of the present invention.
Figure 3:
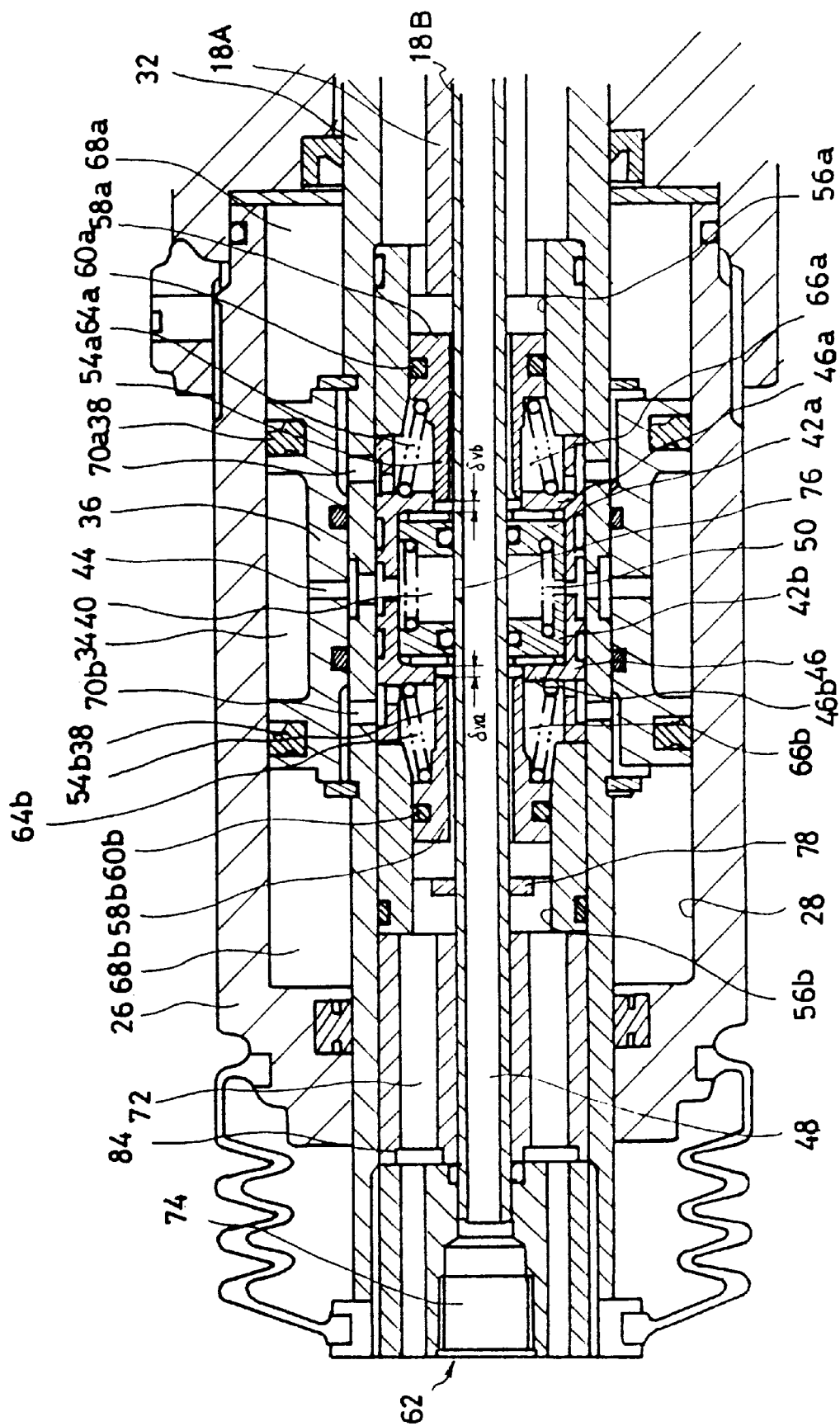
FIG. 3 is a diagram illustrating major portions of the servo operation apparatus on an enlarged scale according to the first embodiment.

FIG. 2 (whole view) and FIG. 3 (view of major portions on an enlarged scale) illustrate the internal structure of the power-shift apparatus 16 according to a first embodiment of the present invention. In the following description, the side of the input shaft 18 of the power-shift apparatus 16 is referred to as "front portion" and the side opposite to the input shaft 18 is referred to as "rear portion".

A pipe-like output shaft 32 penetrates through a cylinder 28 formed in a housing 26 which is a power-shift apparatus body in concentric therewith, the pipe-like output shaft 32 being supported by a front bearing 30a and a rear bearing 30b of the housing 26 so as to slide. Onto the outer peripheral portion of the output shaft 32 is secured the inner peripheral portion of a cylindrical piston 36 which has a pressure storing portion 34 formed in an annular recessed form nearly at the central portion thereof in the axial direction. The outer peripheral portion of the piston 36 inscribes the cylinder 28 via a piston seal 38. In this embodiment, the pressure storing portion 34 is formed in the piston 36. The pressure storing portion 34, however, may be formed in the cylinder 28 or in both the cylinder 28 and the piston 36.

A valve device having a valve chamber 40 is provided in the output shaft 32 nearly at the central portion thereof. In the valve chamber 40 are disposed a pair of valves 42a and 42b being allowed to slide in the axial direction to separate away from each other. The valve chamber 40 between the valves 42a and 42b is communicated with the pressure storing portion 34 of the piston 36 via a communication passage 44 formed in the piston 36 and in the output shaft 32. The valve chamber 40 is formed by a nearly cylindrical seat housing 46 equipped with valve seats 46a and 46b at both ends in the axial direction thereof. In an ordinary state (the power-shift apparatus 16 is inoperative, the same holds hereinafter), the valves 42a and 42b are urged toward the valve seats 46a and 46b and are closed due to the pressure of the working fluid fed to the valve chamber 40 through a working fluid feed passage 48 that will be described later and the resilient urging force of a spring 50 interposed between the valves 42a and 42b.

Lifters 54a and 54b are disposed at the front and rear ends of the seat housing 46 maintaining a predetermined gap $\delta_{Va}$, $\delta_{Vb}$ ($\delta_{Va} \equiv \delta_{Vb}$) relative to the valves 42a, 42b in the ordinary state (see FIG. 3), the lifters 54a, 54b being opposed to the valve seats 46a, 46b and allowed to slide along the inner peripheral walls of reaction cylinders 56a, 56b in the axial direction to open the valves 42a, 42b overcoming the urging force of the spring 50. Reaction pistons 58a, 58b are formed at the ends of the lifters 54a, 54b of the side opposite to the valve chamber 40 to impart the feeling of shift operation. The reaction pistons 58a, 58b inscribe, via piston seals 60a, 60b, the reaction cylinders 56a, 56b that are arranged in concentric with the reaction pistons 58a, 58b. The reaction cylinders 56a, 56b are disposed in contact with both ends of the seat housing 46, and are secured to the output shaft 32 as a unitary structure due to a stepped portion formed in the inner periphery of the output shaft 32 at the front end thereof and a feed/drain passage unit 62 that will be described later and is disposed at the rear end of the output shaft 32. The seat housing 46 is held between the reaction cylinders 56a and 56b, and is secured to the output shaft 32 as a unitary structure.

Between the reaction piston 58a, 58b and the seat housing 46 are interposed springs 64a, 64b for urging the lifters 54a, 54b toward the direction to separate away from the seat housing 46. The reaction chambers 66a, 66b formed between the reaction cylinders 56a, 56b and the seat housing 46, are communicated, respectively, with servo chambers 68a, 68b separated by the piston 36 through communication passages 70a, 70b formed in the output shaft 32. In the ordinary state, the servo chambers 68a, 68b and the reaction chambers 66a, 66b are acquiring the atmospheric pressure by being communicated with a drain passage 72 of the feed/drain passage unit 62 through a gap between the lifters 54a, 54b and the input shaft 18.

The input shaft 18 is constituted by two pipe members 18A and 18B. The pipe member 18A has a link rod 14c coupled to the front end thereof, and is coupled at its rear end to the pipe member 18B through a spherical joint. The pipe member 18B penetrates through the valve chamber 40 and has a spherical joint formed at the front end thereof to be coupled to the inside of the pipe member 18A. The rear end of the pipe member 18B is communicated with a feed passage 74 of the feed/drain passage unit 62 and constitutes a working fluid feed passage 48 together with the feed passage 74. The working fluid is fed to the valve chamber 40 through a throttle portion 76 formed in the central portion of the pipe member 18B. A stopper portion 78 made of a ring member is secured to the outer periphery of the pipe member 18B at the rear end thereof, and comes into contact with the reaction piston 58b of the lifter 54b as the input shaft 18 moves toward the right in FIG. 1, and whereby the reaction piston 58b is pushed toward the right to open the valve 42b overcoming the spring 50. When the input shaft 18 moves toward the left in FIG. 1, the rear end of the pipe member 18A comes into contact with the front end of the lifter 54a and pushes the lifter 54a against the spring 50, so that the valve 42a is opened.

The pipe members 18A and 18B are coupled together through a spherical joint in order to absorb deviation between the pipe members 18A and 18B after the power-shift apparatus 16 is assembled, so that the cost of production and assembly can be decreased.

The pipe member 18A of the input shaft 18 is provided with a nearly elliptic notch 80 with which is engaged a pin 82 secured to the output shaft 32. In the ordinary state, gaps $\delta_{Ma}$, $\delta_{Mb}$ ($\delta_{Ma} \equiv \delta_{Mb}$; $\delta_{Ma} > \delta_{Va}$) are formed between the pin 82 and the notch 80 in the back-and-forth direction. Therefore, the input shaft 18 and the output shaft 32 are allowed to move relative to each other by ($\delta_{Ma} + \delta_{Mb}$). When the amount of relative displacement becomes greater than the above, the input shaft 18 and the output shaft 32 move together.

The feed/drain passage unit 62 is secured being screwed to the interior of the output shaft 32 at the rear end thereof. The drain passage 72 is arranged surrounding the feed passage 74. A filter 84 is provided at the middle of the drain passage 72.

The action of the power-shift apparatus 16 will now be described with reference to FIGS. 1 to 3.

Referring to FIG. 1, when a driver executes the shift operation by operating the shift lever 10 in the direction of an arrow, the input operation force which is rightwardly directed in FIG. 1 is transmitted to the input shaft 18 of the power shift apparatus 16 through the link mechanism 14 constituted by link rods 14a to 14c. The power-shift apparatus 16 boosts the input operation force into an output operation force which is nearly proportional to the input operation force based upon the action of the working fluid. The output operation force is transmitted to the transmission through the shift shaft 20 and the select-and-shift lever 22 to execute the shift-change operation.

At this moment, inside the transmission, the rotational speed of a gear to which the speed will be changed next must be brought into synchronism with a rotational speed determined depending upon the vehicle speed. The force for synchronization is given by a force for pushing the shift rod 24 in the axial direction, and determines the force for depressing the synchronization clutch. When changing into a lower gear, in particular, a large force is required for synchronization and nearly a maximum ability of the power-shift apparatus 16 is required. After the completion of the synchronization, the shift rod 24 quickly moves to a stroke end.

As the input shaft 18 (pipe members 18A and 18B) moves toward the right in FIG. 1 in response to the shift-change operation by the driver in the direction of the arrow in FIG. 1, the stopper portion 78 at the rear end of the pipe member 18B causes the lifter 54b at the rear portion to move toward the right in FIG. 1 against the spring 64b. The front end of the lifter 54b pushes the valve at the rear portion (hereinafter referred to as "valve of the synchronizing side") toward the right to separate away from the valve seat 46b. The working fluid is fed to the feed/drain passage unit 62 from a working fluid feed source (compressor or reservoir tank) that is not shown, and is fed into the valve chamber 40 through the feed passage 74, working fluid feed passage 48 and throttle portion 76. Moreover, the valve chamber 40 and the pressure storing portion 34 are communicated with each other through the communication passage 44, and acquire nearly the same pressure.

As the valve 42b of the synchronizing side is opened, the working fluid is fed to a servo chamber of the rear portion (hereinafter referred to as "servo chamber of the synchronizing side") 68b through the reaction chamber 66b and the communication passage 70b. Accordingly, the pressure rises in the servo chamber 68b of the synchronizing side, the input operation force is boosted, and the output shaft 32 starts moving toward the right via the piston 36. The output shaft 32 turns the select-and-shift lever 22 of the transmission via the shift shaft 20, and causes the shift rod 24 to slide in the axial direction to effect the shift-change operation (see FIG. 1). At this moment, the transmission is arriving at the synchronizing position passing through the neutral position, and the output shaft 32 ceases to move to start synchronization.

Further, as the driver exerts an increased shift operation force to quicken the shift, the lifter 54b at the rear portion further causes the valve to be further opened. Therefore, the air pressure in the servo chamber 68b of the synchronizing side rises depending upon the shift operation force. As the shift operation is further increased, the valves 42b of the synchronizing side is fully opened, and a permissible relative displacement of the output shaft 32 and the input shaft 18 as permitted by the notch 80 formed in the pipe member 18A of the input shaft 18 becomes a maximum ($\delta_{Ma}+\delta_{Mb}$). Since the output shaft 32 stops at the synchronized position, the input shaft 18 stops moving. At this moment, the gap between the notch 80 and the pin 82 is 0 on the left side and is $\delta_{Ma}+\delta_{Mb}$ on the right side. The input operation force given by the shift lever 10 is stored as elastic energy in the rubber dampers 12 in the transmission passage of link rods 14a to 14c.

As the synchronization is completed and the moving resistance against the output shaft 32 decreases, the output shaft 32 moves toward the right in the drawing due to the expansion of the working fluid in the servo chamber 68b of the synchronizing side, and the input shaft 18 also moves toward the right from a position ahead of the output shaft 32 by $\delta_{Mb}$ compared to that of in the ordinary state being urged by the elastic energy stored in the rubber damper 12 and by the displacement of the shift lever 10. In this case, the moving speed of the output shaft 32 is faster than the moving speed of the input shaft 18 and, hence, the output shaft 32 passes the input shaft 18 ahead, and the displacement of the input shaft 18 relative to the output shaft 32 is reversed. Then, the end of the pipe member 18A of the input shaft 18 comes in contact with the reaction piston 58a of the lifter 54a at the front portion, and pushes it toward the left in the drawing so that the valve 42b of the synchronizing side and the valve at the front portion (hereinafter referred to as "valve of the drag side") 42a of the opposite side are pushed and opened overcoming the spring 64a. Therefore, the working fluid is fed to the servo chamber 68b of the synchronizing side and to the servo chamber of the opposite side (hereinafter referred to as "servo chamber of the drag side") 68a, and the pressure rises in the servo chamber 68a.

At this moment, the working fluid previously stored in the pressure storing portion 34 is fed to the servo chamber 68a. In this case, the initially raised pressure value in the servo chamber 68a is determined by the ratio of capacities of the servo chamber 68a and the pressure storing portion 34. Therefore, if the capacity of the pressure storing portion 34 is properly set to limit the initially raised pressure value in the servo chamber 68b at the time of synchronization within a permissible range in which the mechanical portion can be prevented from begin damaged, a sufficiently wide area of the communication passage 44 is maintained between the pressure storing portion 34 and the valve chamber 40, and the gradient of rise in the initial pressure can be made steep. After the completion of the synchronization, therefore, the pressure in the servo chamber 68a of the drag side can be raised very quickly compared to that of a conventional power-shift apparatus.

Figure 4:
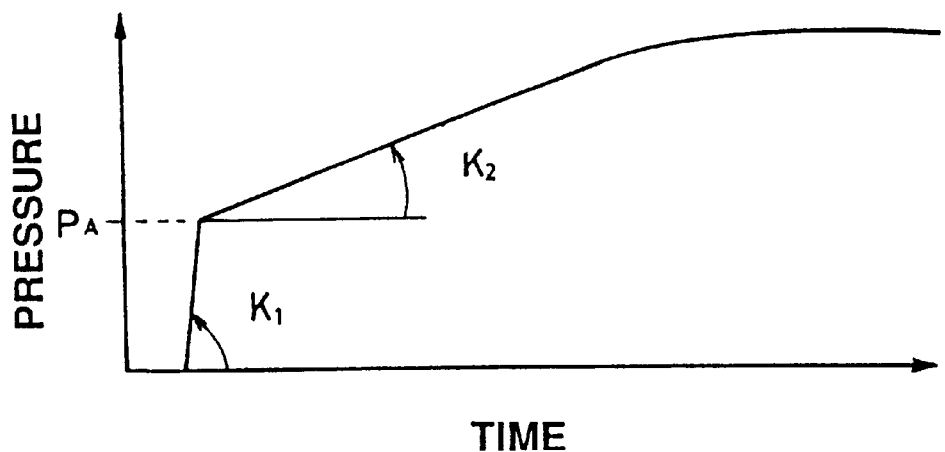
FIG. 4 is a diagram of pressure rise characteristics in a servo chamber in the servo operation apparatus of the present invention.

FIG. 4 illustrates pressure rise characteristics in the servo chamber during the shift-change operation according to the embodiment.

Referring to FIG. 4, if a permissible value of the initially raised pressure in the servo chambers 68a, 68b at the time of synchronization is denoted by $P_A$, the working fluid stored in the pressure storing portion 34 is fed to the servo chamber 68a or 68b as the valve 42a or 42b is opened with a pressure rise gradient $K_1$ which is steeper than the conventional pressure rise gradient K ($K_1>K$) until the pressure $P_A$ is reached. Thereafter, the pressure in the servo chamber 68a or 68b is raised with a pressure rise gradient $K_2$ ($K_2<K_1$) due to the working fluid fed to the valve chamber 40 from the working fluid feed source through the working fluid feed passage 48 and the throttle portion 76. As described above, the pressure $P_A$ is determined by the ratio of capacities of the pressure storing portion 34 and the servo chamber 68a or 68b. The gradient $K_1$ is determined by the areas of the openings of the communication passage 44 between the pressure storing portion 34 and the valve chamber 40, of the gap between the lifter 54a (or 54b) and the seat housing 46a (or 46b) and of the communication passage 70a (or 70b) between the reaction chamber 66a (or 66b) and the servo chamber 68a (or 68b), and by the passing area between the valve 42a (or 42b) that is opening and the valve seat 46a (or 46b). After the pressure $P_A$ is reached, the pressure gradient $K_2$ is determined by the conduit resistance from the working fluid feed source to the throttle portion 76 and chiefly by the area of the opening of the throttle portion 76, area of the opening between the valve 42a (or 42b) that is opening and the valve seat 46a (46b), the gap between the lifter 54a (or 54b) and the valve seat 46a (or 46b), and area of the opening of the communication passage 70a (or 70b) between the reaction chamber 66a (or 66b) and the servo chamber 68a (or 68b).

Therefore, the area of the passage from the valve chamber 40 to the servo chamber 68a, 68b and, chiefly, the opening areas between the valves 42a, 42b and valve seats 46a, 46b, are so set that the pressure gradient $K_1$ can be maintained, and the opening area of the throttle portion 76 is so set that the pressure gradient $K_2$ can be obtained.

According to this constitution, the initial pressure rises quickly in the servo chamber 68a of the drag side after the completion of the synchronization, and a large braking force is applied to the output shaft 32 in the direction of its motion after the completion of the synchronization. Therefore, the moving speed of the output shaft 32 is greatly decreased, and the impact force produced as the output shaft 32 collides with the input shaft 18 is greatly decreased. Accordingly, an impact force transmitted to the shift lever 10 is decreased, and the feeling of shift is improved at the time of shift-change and, particularly, after the completion of the synchronization. Moreover, the initially raised pressure in the servo chambers 68a, 68b are confined in a permissible range, and the mechanical portion is prevented from being damaged at the time of synchronization.

Figure 5:
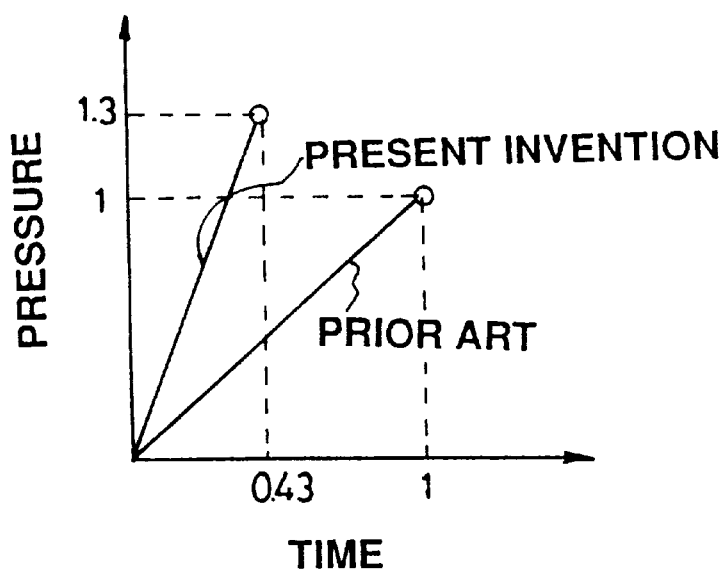
FIG. 5 is a diagram of pressure rise characteristics in a servo chamber of the drag side after the completion of the synchronization according to the present invention.

FIG. 5 shows the data of the present invention in comparison with the data of the conventional apparatus concerning the pressure characteristics in the servo chamber on the drag side after the completion of the. synchronization and after the output shaft 32 has passed the input shaft 18 ahead causing the valve of the drag side to be opened.

According to the apparatus of the present invention as shown in FIG. 5, the time for arriving at a maximum pressure is shortened to 43% and the maximum pressure that is accomplished is increased to 130% compared to those of the conventional apparatus. In FIG. 5, the values of the apparatus of the present invention are those of when the pressure reached by the conventional apparatus and the required time are set to be 1, respectively.

That is, the data of FIG. 5 indicate that the apparatus of the present invention quickly generates a large braking force after the completion of the synchronization compared with the conventional apparatus.

In the above-mentioned first embodiment, the pressure storing portion 34 is disposed separately from the working fluid feed passage through which the working fluid is fed into the valve chamber 40 from the working fluid feed source. However, the pressure storing portion may be disposed in part of the working fluid feed passage. Described below is an embodiment of this power-shift apparatus.

Figure 6:
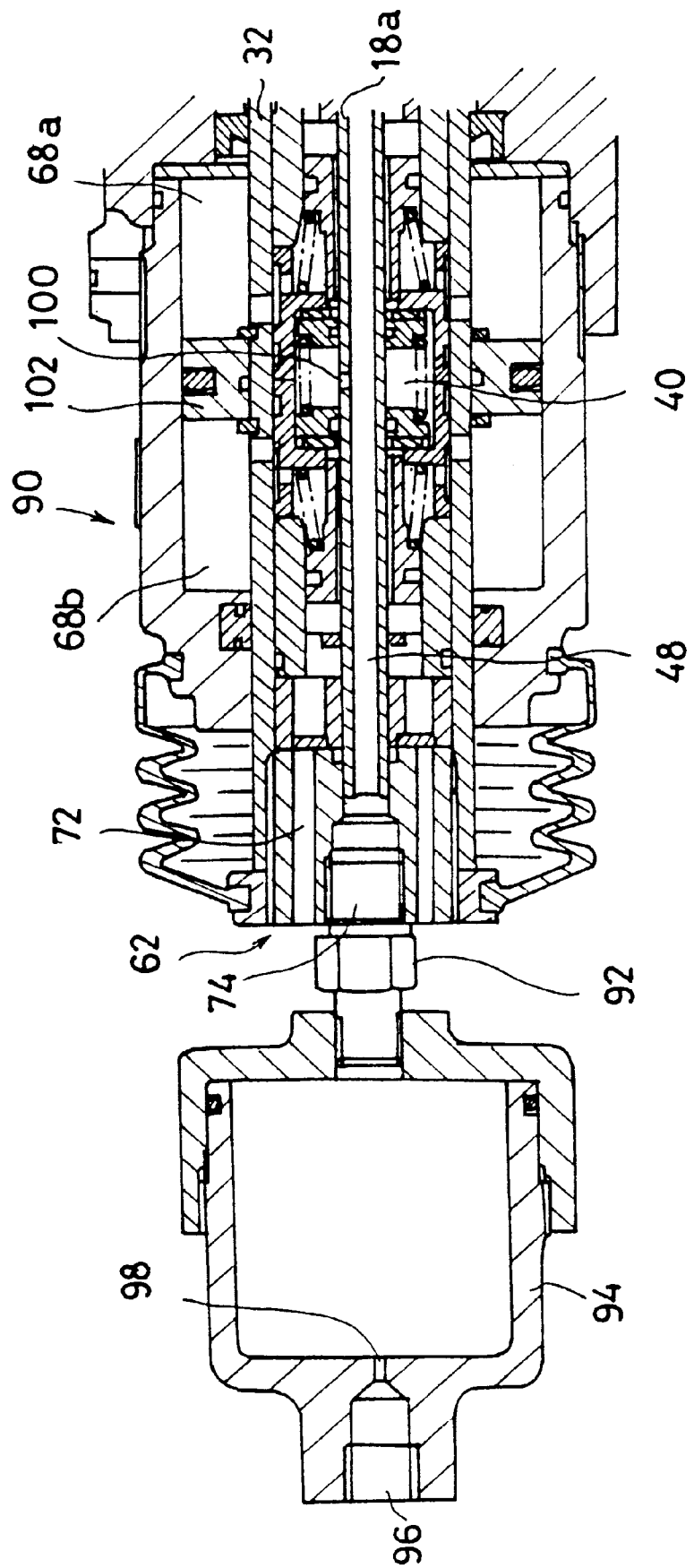
FIG. 6 is a diagram illustrating major portions of the servo operation apparatus on an enlarged scale according to a second embodiment of the present invention.

FIG. 6 is a diagram illustrating the constitution of major portions according to a second embodiment of the present invention. The elements same as those of the first embodiment are denoted by the same reference numerals and their description is omitted.

In a power-shift apparatus 90 shown in FIG. 6, a separate pressure storing portion 94 is secured, via a nipple 92, to the inlet of the feed passage 74 of the feed/drain passage unit 62. A throttle portion 98 is formed on the outlet side of a feed port 96 of the pressure storing portion 94 connected to the working fluid feed source that is not shown. A communication passage 100 through which the working fluid feed passage 48 in the pipe member 18B of the input shaft 18 is communicated with the valve chamber 40, has the area of opening larger than that of the conventional power-shift apparatus. That is, in this embodiment, the working fluid feed passage to the valve chamber 40 includes the pressure storing portion 94, feed passage 74, working fluid feed passage 48 and communication passage 100. A piston 102 has nearly a cylindrical shape.

In this constitution, the ratio of the capacities of the pressure storing portion 94 and the servo chambers 68a, 68b is so set that the pressure initially rises to $P_A$ in the servo chambers 68a, 68b, and the opening area of the communication passage 100 and the passage area from the valve chamber 40 to the servo chambers 68a, 68b after the valves are opened are so set that the pressure rises with a gradient $K_1$ in the servo chambers 68a, 68b. Moreover, the opening area of the throttle portion 98 of the feed port 96 is so set that the pressure rises with a gradient $K_2$ after the pressure $P_A$ has been reached. Thus, the effects similar to those of the first embodiment are obtained.

If the pressure storing portion 94 is not secured to the power-shift apparatus 90 but is connected to the nipple 92 through a conduit, then, the pressure storing portion 94 can be arranged at any place.

Figure 7:
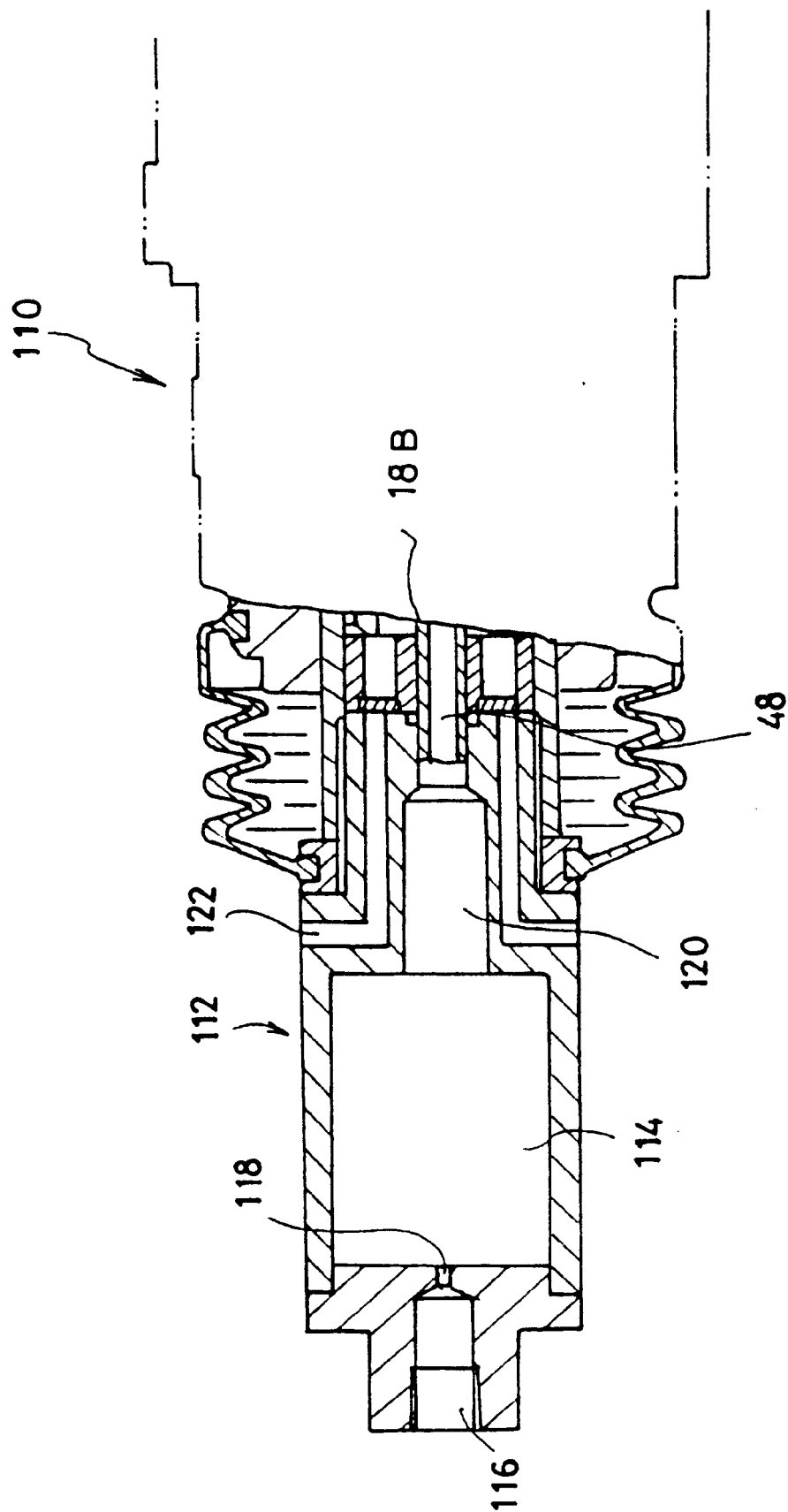
FIG. 7 is a diagram illustrating major portions of the servo operation apparatus on an enlarged scale according to a third embodiment of the present invention.

FIG. 7 is a diagram illustrating the constitution of major portions according to a third embodiment of the present invention. The elements same as those of the first and second embodiments are denoted by the same reference numerals and their description is omitted.

In a power-shift apparatus 110 of FIG. 7, a pressure storing portion 114 is formed at the inlet of a feed/drain passage unit 112 as a unitary structure. That is, the pressure storing portion 114 is formed at the inlet of the feed/drain passage unit 112 as a unitary structure, and a throttle portion 118 is formed at the outlet of a feed port 116 connected to the working fluid feed source that is not shown. Reference numeral 120 denotes a feed passage that connects to the working fluid feed passage 48 in the pipe member 18B, and 122 denotes a drain passage. That is, in this embodiment, the working fluid feed passage to the valve chamber 40 includes the feed port 116, pressure storing portion 114, feed passage 120, working fluid feed passage 48 and communication passage 100.

Besides, since the pressure storing portion 114 is formed in the feed/drain passage unit 112 as a unitary structure, the number of the constituent parts can be decreased compared with that of the second embodiment.

Figure 8:
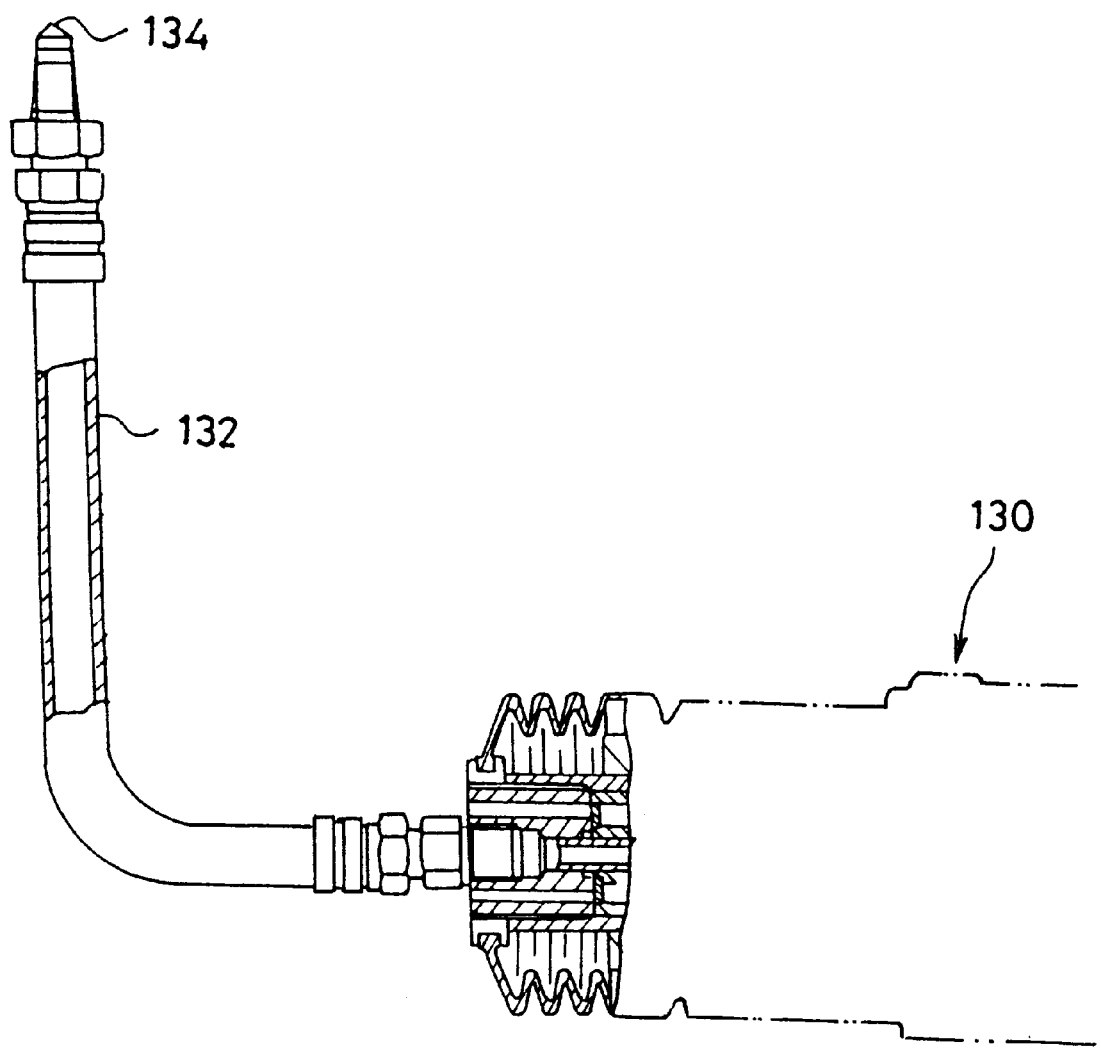
FIG. 8 is a diagram illustrating major portions of the servo operation apparatus on an enlarged scale according to a fourth embodiment of the present invention.

FIG. 8 is a diagram illustrating the constitution of major portions according to a fourth embodiment of the present invention. The same elements as those of the first to third embodiments are denoted by the same reference numerals and their description is omitted.

In a power-shift apparatus 130 of FIG. 8, a large-capacity conduit 132 that connects the working fluid feed source to the power-shift apparatus 130 is furnished with a function of the pressure storing portion, and a throttle portion 134 is provided on the side of the inlet of the large-capacity conduit 132 instead of providing the pressure storing portion 94 of the second embodiment shown in FIG. 6 or the pressure storing portion 114 of the third embodiment shown in FIG. 7. That is, in this embodiment, the working fluid feed passage to the valve chamber 40 includes the large-capacity conduit 132, feed passage 74, working fluid feed passage 48 and communication passage 100.

This constitution makes it possible to obtain the effects same as those of the first to third embodiments.

Figure 9:
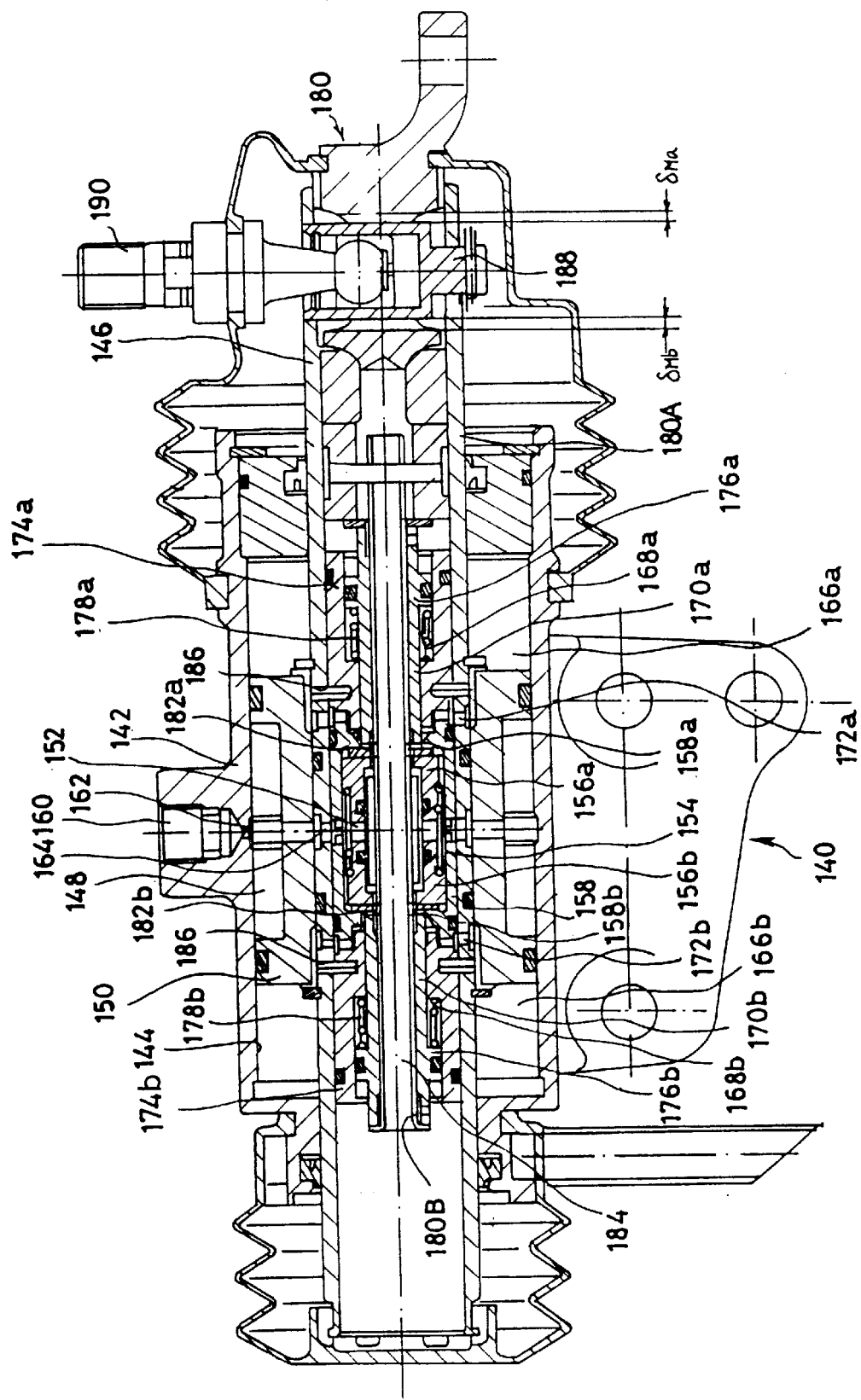
FIG. 9 is a diagram illustrating the whole servo operation apparatus according to a fifth embodiment of the present invention.

Described below with reference to FIG. 9 is a fifth embodiment according to the present invention.

In a power-shift apparatus 140 according to this embodiment, the working fluid is fed from the peripheral wall of the housing.

A cylinder 144 of a housing 142, an output shaft 146, a piston 150 having a pressure storing portion 148, a valve chamber 152, valve 156a and 156b that receive urging force of a spring 154, valve seats 158a and 158b, and a seat housing 158, are nearly the same in their basic constitutions as those of the aforementioned embodiments.

This embodiment is different from the foregoing embodiments with regard to that the working fluid is directly fed to the valve chamber 152 from the working fluid feed source through a working fluid feed port 160 formed in the peripheral wall of the housing 142 and a throttle portion 162. Therefore, the working fluid feed passage includes the working fluid feed port 160, communication passage 164 formed in the piston 150 and in the output shaft 146, and valve chamber 152.

This embodiment is further different in regard to that the valve seats 158a and 158b are directly communicated with servo chambers 166a, 166b, and the valve seats 158a, 158b are communicated with reaction chambers 168a, 168b in parallel. That is, the end of the reaction cylinder on the side of the valve chamber in the foregoing embodiments is extended to come into slidable contact with the outer peripheries of lifters 170a, 170b, and the valve seats 158a, 158b are communicated with the servo chambers 166a, 166b through communication passages 172a, 172b formed in the output shaft 146 but without through the reaction chambers 168a, 168b. The reaction chambers 168a, 168b, on the other hand, are communicated with the valve seats 158a, 158b through gaps between reaction cylinders 174a, 174b and the lifters 170a, 170b. Springs 178a, 178b for imparting force to the shift operation are interposed between reaction pistons 176a, 176b of the lifters and the ends of the reaction cylinders 174a, 174b on the side of the valve chamber 152.

In the ordinary state, the servo chambers 166a, 166b and the reaction chambers 168a, 168b are communicated with a drain passage 184 in a pipe member 180B through gaps between the ends of the lifers 170a, 170b and the valve seats 158a, 158b and through drain ports 182a, 182b formed in the pipe member 180B, and hence acquire nearly the atmospheric pressure.

Unlike the foregoing embodiments, the reaction cylinders 174a, 174b in this embodiment are secured to the output shaft 146 via a pin 186 as a unitary structure, and move accompanying the motion of the output shaft 146.

This embodiment is further different in regard to that a cylindrical output lever guide 188 is secured to the end of the output shaft 146, and an output lever 190 is coupled thereto to take out the shift-change operation force to the external unit.

The boosting operation of the power-shift apparatus 140 is nearly the same as those of the first to fourth embodiments, but the working fluid-feed passage and the reaction chambers 168a, 168b simply have different constitutions. The boosting operation and the reaction-imparting operation of the power-shift apparatus 140 will now be briefly described. To simplify the description of the operation, mentioned below is the servo operation toward the right only in FIG. 9, since the operation is symmetrical.

That is, the shift-change operation force is transmitted from the shift lever 10 through the link mechanism 14, and an input shaft 180 moves toward the right in the drawing. Then, the lifter 170b moves toward the right in the drawing against the spring 178b. The end of the lifter 170b pushes the valve 156b toward the right to separate away from the valve seat 158b. Then, the working fluid is fed from the working fluid feed source to the valve chamber 152 through the working fluid feed port 160, throttle portion 162, pressure storing portion 148 and communication passage 164, and is fed to the servo chamber 166b through a gap between the valve 156b and the valve seat 158b and through the communication passage 172b, and is further fed to the reaction chamber 168b through a gap between the reaction cylinder 174b and the lifter 170b. Accordingly, the shift-change operation force is boosted by the working fluid fed to the servo chamber 166b, and comfortable feeling is imparted to the shift operation owing to the working fluid fed into the reaction chamber 168b.

Even in this embodiment, the initially raised pressure $P_A$ and the pressure rise gradients $K_1$, $K_2$ are set by suitably setting the ratio of volumes of the pressure storing portion 148 and the servo chamber 166b, and the gap area between the valve 156b that is opened and the valve seat 158b, and the opening area of the throttle portion 162.

Described below is a sixth embodiment according to the present invention. The constitution of this embodiment is basically the same as that of the power-shift apparatus 140 of the fifth embodiment except that the servo chambers 166a, 166b are communicated with the reaction chambers 168a, 168b through communication passages 192a, 192b, and the direct communication between the valve seats 158a, 158b and the reaction chambers 168a, 168b is shut off by seals 194a, 194b interposed between the reaction cylinders 174a, 174b and the lifters 170a, 170b (see FIG. 10). Therefore, the elements same as those of the fifth embodiment are denoted by the same reference numerals and their description is omitted. The right side and the left side of the major portions are symmetrical to each other. Therefore, the right half only is diagramed and the left half is omitted.

Figure 10:
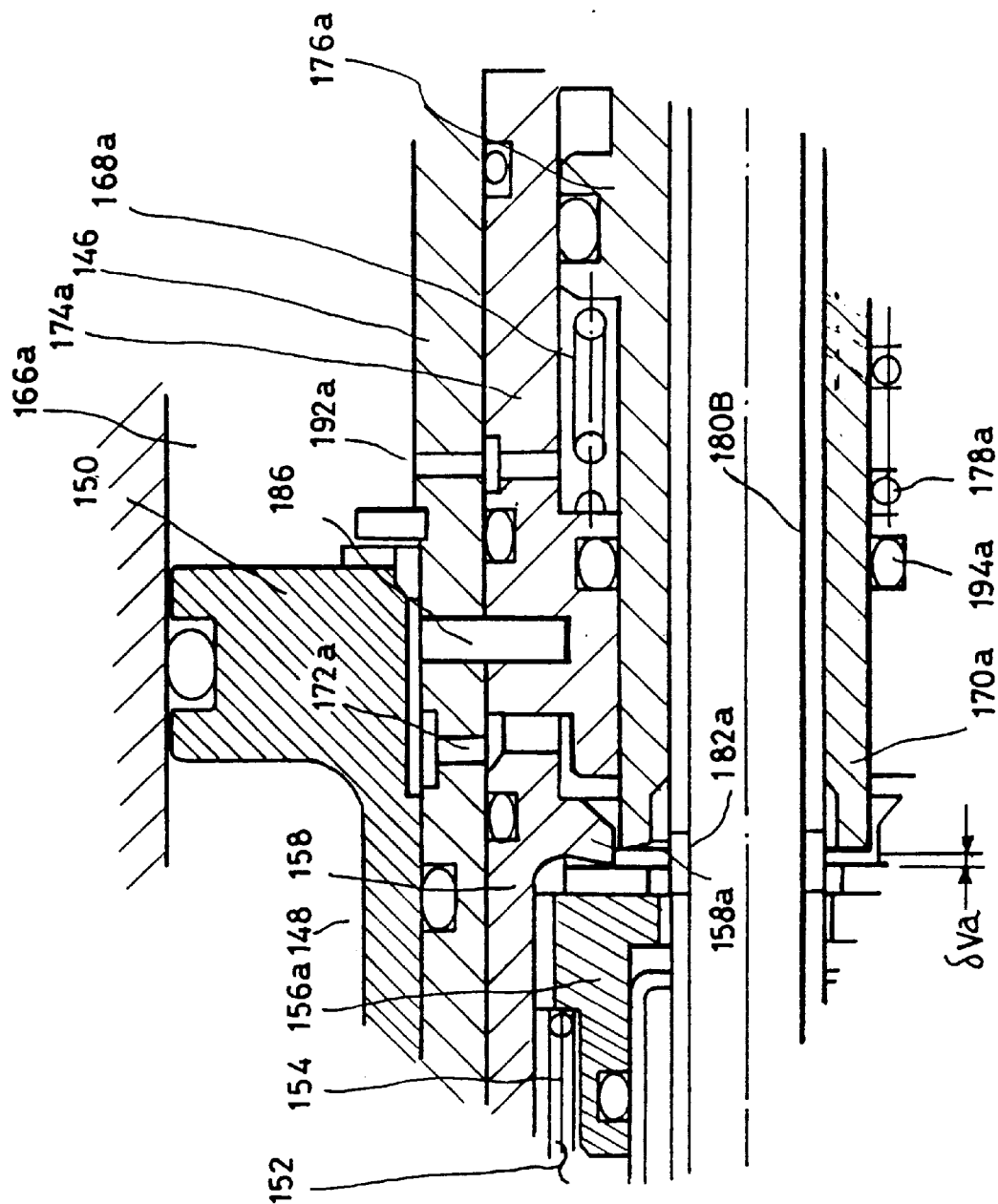
FIG. 10 is a diagram illustrating major portions of the servo operation apparatus on an enlarged scale according to a sixth embodiment of the present invention.

That is, referring to FIG. 10, the seal 194a is disposed on the inner wall of the reaction cylinder 174a to shut off the communication between the valve seat 158a and the reaction chamber 168a, and the communication passage 192a is formed in the reaction cylinder 174a and in the output shaft 146 to communicate the reaction chamber 168a with the servo chamber 166a.

In the thus constituted power-shift apparatus, when the valve of the drag side is separated away from the valve seat and is opened after the completion of the synchronization, the working fluid is not directly introduced into the reaction chamber 168a due to the seal 194abut is introduced into the reaction chamber 168a through the servo chamber 166a. That is, the reaction chambers 168a is supplied with the working fluid of a decreased pressure after having once expanded in the servo chamber 166a. Therefore, the pressure mildly rises in the reaction chamber 168a, and the reaction in the reaction chamber 168a does not create an impact. Accordingly, only the force for separating the valve 156a from the valve seat 158a to open it is transmitted to the shift lever 10 through the link mechanism 14, and an impact force transmitted to the shift lever 10 is decreased and the feeling of shift is improved.

The effect for decreasing the impact force according to this embodiment is weaker than the effect for decreasing the impact force of the first to fifth embodiments. In the power-shift apparatus having a basic constitution in which the servo chamber and the reaction chambers are communicated with the valve seats in parallel like in the fifth embodiment shown in FIG. 9, however, the impact force can be decreased by slightly modifying the existing power-shift apparatus, which is advantageous.

Figure 11:
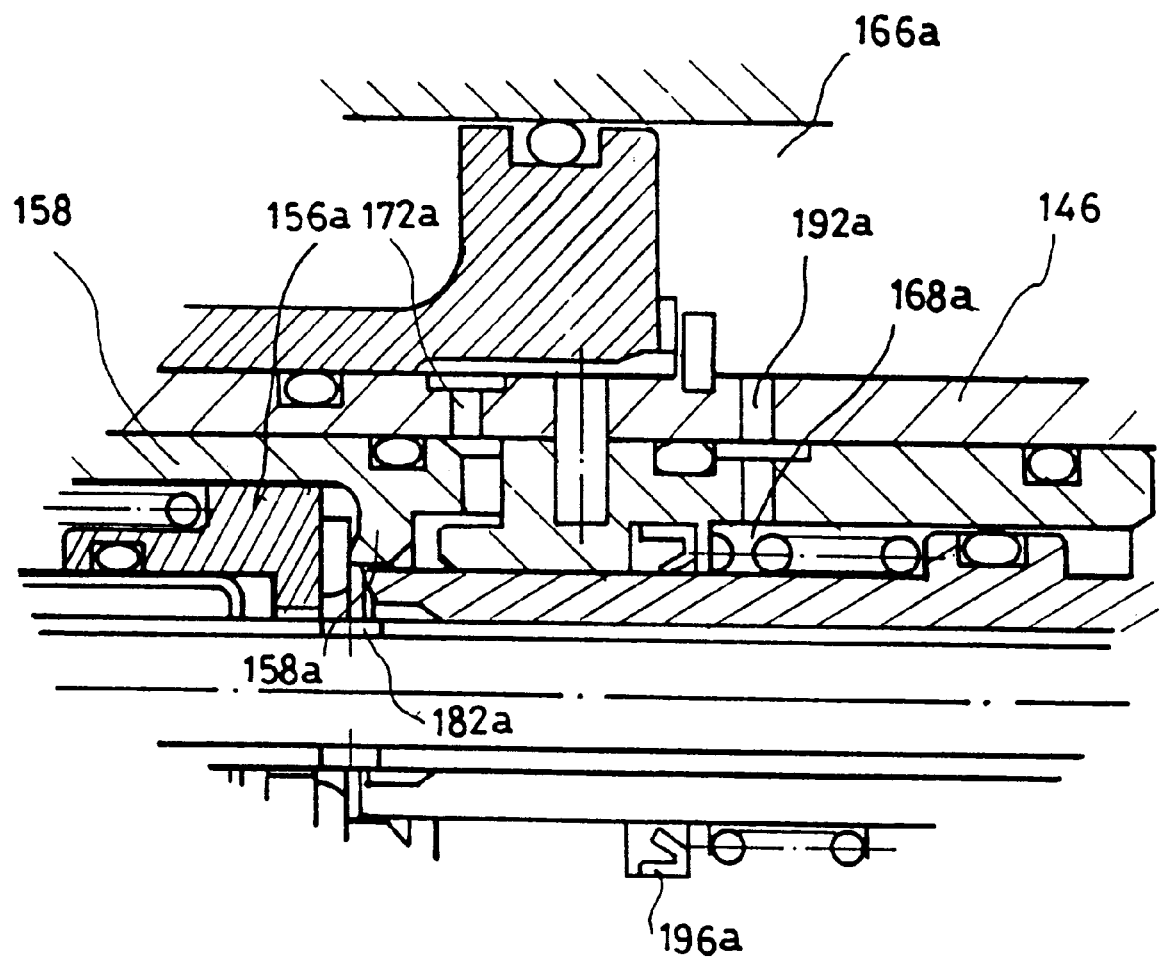
FIG. 11 is a diagram illustrating major portions of the servo operation apparatus on an enlarged scale according to a seventh embodiment of the present invention.

FIG. 11 illustrates a seventh embodiment according to the present invention which exhibits the actions and effects of the sixth embodiment but more effectively. The elements same as those of the sixth embodiment are denoted by the same reference numerals and their description is omitted. The right side and the left side of the major portions are symmetrical to each other. Therefore, the right half only is diagramed and the left half is omitted.

This embodiment is different from the sixth embodiment in regard to a function possessed by the seal which shuts off the communication between the valve seat 158a and the reaction chamber 168a.

That is, the seal 194a in the sixth embodiment is a bidirectional seal as represented by an O-ring seal, and has a function for preventing the flow of the working fluid from the valve seat 158a to the reaction chamber 168a and for preventing the flow of the working fluid from the reaction chamber 168a to the valve seat 158a.

The seal 196a according to this embodiment, on the other hand, is a monodirectional seal such as a U-shaped packing and has a so-called check valve function which, when the pressure is elevated on the side opposite to the seal side, causes a lip to be pushed up, permitting the fluid to flow into the seal side form the opposite side. That is, the seal 196a is so disposed as to prevent the flow of the working fluid into the reaction chamber 168a from the valve seat 158a but to permit the working fluid to flow in the valve seat 158a from the reaction chamber 168a.

Here, the operation of the seal 196a of when the shift-change operation is effected, will be described with reference to FIG. 11. In the following description, the front portion corresponding to the right side of the drawing is referred to as the "synchronizing side".

When the synchronization is completed in the shift-change operation, the relative displacements of the input shaft 180 and the output shaft 146 are reversed, as described before, whereby the lifter 170a of the synchronizing side moves toward a direction to separate away from the valve 156a, and the working fluid in the servo chamber 166a is drained to the open air through the communication passage 172a and the drain passage 184. Furthermore, the working fluid in the reaction chamber 168a is drained into the open air through the communication passage 192a and the servo chamber 166a and through the gap between the reaction cylinder 174a and the lifter 170a since the lip of the seal 196a is pushed up by the pressure on the opposite side (pressure in the reaction chamber 168a) which is higher than the pressure of the seal side (atmospheric pressure).

That is, the working fluid in the reaction chamber 168a is quickly drained by the seal 196a and, hence, the moving resistance of the input shaft 180 decreases immediately after the completion of the synchronization and the moving speed increases.

It is therefore allowed to delay the timing for opening the valve seat 158b on the drag side after the completion of the synchronization; i.e., the rise of the pressure in the servo chamber 166b of the drag side is delayed and the impact force is prevented from generating. Accordingly, the feeling of shift is further improved.

Next, described below is an eighth embodiment of the present invention.

This embodiment is a combination of the fifth embodiment and the sixth embodiment (or seventh embodiment) and in which is further incorporated a damper unit as a unitary structure.

Figure 12:
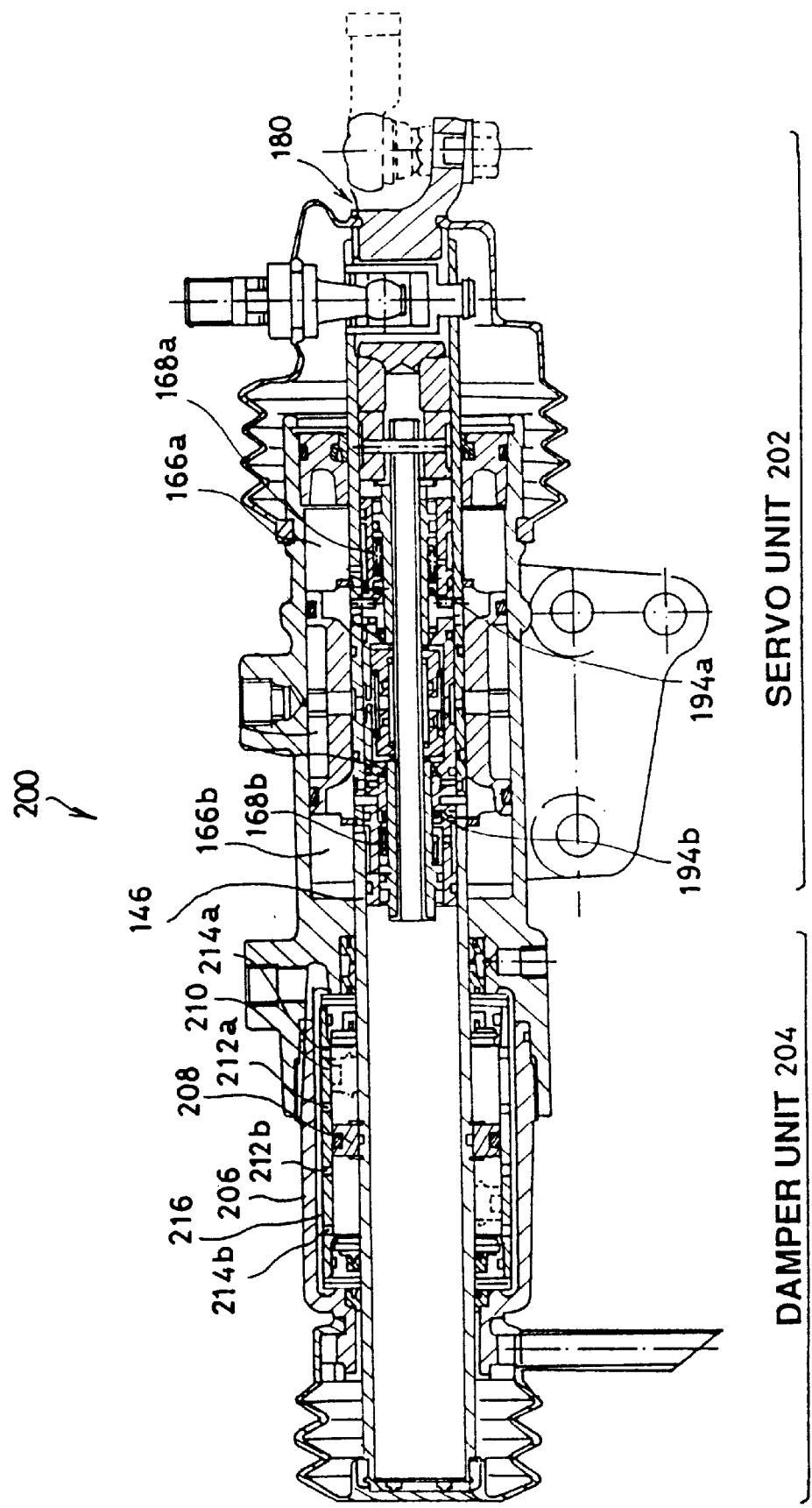
FIG. 12 is a diagram illustrating the whole servo operation apparatus according to an eighth invention of the present invention.

Referring to FIG. 12, a power-shift apparatus 200 of this embodiment is provided with a servo unit 202 and a damper unit 204.

The servo unit 202 is the same as the one previously proposed by the present applicant in Japanese Patent Application No. 8-77673 and the damper unit 204 is the same as the one previously proposed by the present applicant in Japanese Patent Application No. 8-77437. The elements same as those of the fifth and sixth embodiments are denoted by the same reference numerals and their description is omitted. The right side and the left side of the major portions are symmetrical to each other and, hence, described below is the case where the boosting operation is effected toward the right only in FIG. 12.

First, described below is the damper unit 204. The interior of a damper housing 206 is filled with a viscous fluid such as silicone oil. During the period in which the output shaft 146 and a piston 208 are moving from the neutral position to the synchronized position as a result of the shift operation, the viscous fluid in one chamber in the cylinder 210 divided by the piston 208 moves into the other chamber through small holes 212a, 214a formed at two places and outer space 216. In this case, the viscous fluid flows through the two small holes 212a, 214a and, hence, the flow resistance is small and the damper effect is weak.

As the synchronizing position is reached, the piston 208 closes one small hole 212a so that the viscous fluid flows through the passage of a decreased area. At the synchronized position, the transmission accomplishes the synchronization. Therefore, the output shaft 146 and the piston 208 are in the halted state, the viscous fluid no longer flows, and the output on the side of the servo unit 202 is not substantially decreased.

As the synchronization of the transmission is completed, the moving resistance against the output shaft 146 suddenly decreases, the working fluid in the servo chamber 166b expands causing the output shaft 146 to suddenly move toward the right in FIG. 12, and whereby the piston 208 is urged to suddenly move toward the stroke end. However, the viscous fluid in the cylinder is drained to the outer space 216 through one small hole 214a only. Therefore, the viscous fluid produces a large flow resistance and exhibits a damper effect to suppress sudden motion of the piston 208.

Owing to the braking effect based upon a quick rise in the pressure in the servo chamber on the drag side and the damper effect on the side of the servo unit 202, the impact force of the output shaft 146 upon the input shaft 180 is further decreased after the completion of the synchronization, and the feeling of shift is further improved. Moreover, when the impact-absorbing ability is set to be the same as the one obtained by the damper unit alone, the damper unit 204 can be fabricated in a size which is decreased correspondingly to the braking effect of the servo unit 202.

In the case of the servo unit 202 of this embodiment, when the valve seat of the drag side is opened after the completion of the synchronization, the working fluid is not directly introduced into the reaction chamber 168a due to the seal 194a but is introduced thereto passing through the servo chamber 166a. After the completion of the synchronization, therefore, the reaction in the reaction chamber 168a of the drag side does not produce an impact force and, hence, an impact force transmitted to the shift lever 10 is decreased. Accordingly, the feeling of shift is further improved.

Here, however, the feeling of shift can be improved by decreasing the impact force relying upon the servo chamber and the reaction chamber of the drag side without providing the damper unit 204. In this case, the effect for suppressing the impact force decreases to some extent compared with that of the eighth embodiment, but the power-shift apparatus does not become bulky, and the impact force can be greatly decreased compared to the prior art owing to the synergistic effect of the servo chamber and the reaction chamber.

We claim:

1. A servo operation apparatus for a transmission comprising:

An input shaft to which the shift-change operation force is mechanically transmitted from a shift lever;

A servo unit for boosting said shift change-operation force by feeding a working fluid feed source to servo chambers divided by a piston inscribing a cylinder;

a reaction device of the synchronizing side and a reaction device of the drag side for imparting the reaction that works as a drag against said shift-change operation force upon being supplied with said working fluid;

an output shaft to which said piston is secured as a unitary structure and which is disposed to move relative to said input shaft and transmits the shift-change operation force boosted by said servo unit to a transmission;

a valve device which switchingly feeds the working fluid to said servo unit and said reaction device of the synchronizing side from the start of the shift to the completion of the synchronization and to said servo unit and said reaction device of the drag side from the completion of the synchronization to the completion of the shift depending upon the relative positions of said input shaft and-said output shaft; and a second working fluid feed control means which feeds the working fluid in such a manner that the rise of the pressure of the working fluid in said reaction device of the drag side is delayed behind the rise of the pressure of the working fluid in said servo unit.

2. A servo operation apparatus for a transmission according to claim 1, wherein said valve device includes a nearly cylindrical seat housing having valve seats formed at both ends in the axial direction thereof, a pair of valves disposed in said seat housing and come into contact with, or separate way from, said valve seats so as to be closed or opened, springs interposed between said pair of valves and urging said valves against said valve seats so as to be closed, and a pair of lifters which move together with said input shaft in the axial direction thereof to separate said valves away from said valve seats overcoming the urging force of said spring so as to be opened; and wherein said valve device is secured inside said output shaft, said input shaft penetrates through said valve device to freely slide in the axial direction thereof, the working fluid is fed to said valve device through an working fluid passage formed inside said input shaft and a throttle portion formed in said input shaft, and said reaction devices are each constituted by a piston formed in the peripheral wall of said lifter, a cylinder inscribed by said piston, and a spring which is interposed between said piston and said cylinder to urge said piston toward a direction to separate away from said valve.

3. A servo operation apparatus for a transmission according to claim 1, wherein said second working fluid feed control means is constituted by a sealing member for shutting off the passage which directly communicates said valve device with said reaction devices, and a communication passage which communicates said servo unit with said reaction devices, enabling said valve device to be indirectly communicated with said reaction devices through said servo unit.

4. A servo operation apparatus for a transmission according to claim 3, wherein said sealing member is an O-ring.

5. A servo operation apparatus for a transmission according to claim 3, wherein said sealing member has a sealing portion which so deforms as to usually maintain sealing in the passage through which said valve device is directly communicated with said reaction devices and to no longer maintain the sealing when the working fluid is to be drained from said reaction devices.

6. A servo operation apparatus for a transmission according to claim 1, wherein said reaction device is supplied with said working fluid through said servo chamber.

* * * * *

UNITED STATES PATENT AND TRADEMARK OFFICE
CERTIFICATE OF CORRECTION

PATENT NO. : 5,947,000
DATED : September 7, 1999
INVENTOR(S) : Keiichi KAZUMORI, et al.

It is certified that error appears in the above-identified patent and that said Letters Patent is hereby corrected as shown below:

IN THE DRAWINGS:

SHEET 5 OF 11

Figure 6 "numeral 18a" should be "numeral 18B"

Signed and Sealed this

Sixteenth Day of May, 2000

*Attest:*

Q. TODD DICKINSON

*Attesting Officer*     *Director of Patents and Trademarks*